US009190017B2

(12) United States Patent
Matel

(10) Patent No.: US 9,190,017 B2
(45) Date of Patent: Nov. 17, 2015

(54) PROPORTIONAL POINTER TRANSITION BETWEEN MULTIPLE DISPLAY DEVICES

(71) Applicant: International Business Machines Corporation, Armonk, NY (US)

(72) Inventor: Mark G. Matel, Dubuque, IA (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 13/732,463

(22) Filed: Jan. 2, 2013

(65) Prior Publication Data

US 2014/0184652 A1 Jul. 3, 2014

(51) Int. Cl.
*G09G 5/00* (2006.01)
*G09G 5/08* (2006.01)
*G06F 3/14* (2006.01)

(52) U.S. Cl.
CPC ............ *G09G 5/08* (2013.01); *G06F 3/1423* (2013.01); *G09G 2340/0407* (2013.01); *G09G 2340/0464* (2013.01)

(58) Field of Classification Search
None
See application file for complete search history.

(56) References Cited

U.S. PATENT DOCUMENTS

| | | | | |
|---|---|---|---|---|
| 5,621,430 | A * | 4/1997 | Bricklin | 715/856 |
| 5,777,615 | A | 7/1998 | Barber et al. | |
| 6,523,061 | B1 | 2/2003 | Halverson et al. | |
| 7,525,511 | B2 * | 4/2009 | Baudisch | 345/1.3 |
| 7,557,774 | B2 * | 7/2009 | Baudisch et al. | 345/1.1 |
| 7,624,339 | B1 | 11/2009 | Engel et al. | |
| 8,023,444 | B2 | 9/2011 | Bowser et al. | |
| 8,234,059 | B2 | 7/2012 | Sugiyama et al. | |
| 2002/0151283 | A1 * | 10/2002 | Pallakoff | 455/90 |
| 2002/0167531 | A1 * | 11/2002 | Baudisch | 345/611 |
| 2002/0181786 | A1 | 12/2002 | Stark et al. | |
| 2006/0230136 | A1 | 10/2006 | Ma | |
| 2009/0228824 | A1 | 9/2009 | Forstall et al. | |
| 2009/0290079 | A1 | 11/2009 | Evans et al. | |
| 2011/0231790 | A1 | 9/2011 | Forstall et al. | |
| 2011/0280170 | A1 | 11/2011 | Bowser et al. | |
| 2012/0001829 | A1 | 1/2012 | Anttila et al. | |
| 2012/0081271 | A1 | 4/2012 | Gimpl et al. | |
| 2012/0223872 | A1 | 9/2012 | Ram | |

OTHER PUBLICATIONS

Ip.com, Prior Art Database, Technical Disclosure, "Multiple Display Screen Border Calculation for Intuitive Navigational Transition amongst Displays whose Characteristics May Differentiate", Authors et al. Disclosed Anonymously, Ip.com No. IPCOM000214060D, Ip.com Electronic Publication Jan. 6, 2012, 2 pp.

Hennecke et al., "How Screen Transitions Influence Touch and Pointer Interaction Across Angled Display Arrangements", Chi'12, May 5-10, 2012, Austin, Texas, Copyright 2012, 4 pp.

(Continued)

*Primary Examiner* — Edward Martello
(74) *Attorney, Agent, or Firm* — John R. Pivnichny; Keohane & D'Alessandro PLLC; Hunter E. Webb

(57) ABSTRACT

An approach is provided for automatically calculating and delivering proportional pointer locations during transition between multiple visual display devices (e.g., in regard to their characteristics, which may be heterogeneous, homogenous, or a mixture thereof). Specifically, the approaches described herein provide a solution for finding proportional locations of a pointer's on-screen graphic as the pointer is being transitioned/moved between multiple display devices (e.g., controlled by a single computer or controller).

20 Claims, 9 Drawing Sheets

(56) References Cited

OTHER PUBLICATIONS

Columbia University, "Multi Monitor Mouse (M3)", Author Unknown, Date Printed Dec. 17, 2012, 2 pp.
Benko et al., "Pointer Warping in Heterogeneous Multi-Monitor Environments", Graphics Interface Conference May 28-30, 2007, Montreal, Canada, pp. 111-117.
Xiao et al., "Ubiquitous Cursor: a Comparison of Direct and Indirect Pointing Feedback in Multi-Display Environments", Graphics Interface Conference May 25-27, 2011, St. John's, Newfoundland, Canada, pp. 135-142.
Hrvoje Benko, "User Interaction in Hybrid Multi-Display Environments", Columbia University 2007, 230 pp.

* cited by examiner

PROPORTIONAL POINTER TRANSITION BETWEEN MULTIPLE DISPLAY DEVICES

TECHNICAL FIELD

Aspects of the present invention relate to display device transition of a pointer graphic or icon. Specifically, aspects of the present invention relate to providing proportional pointer transition between multiple display devices (e.g., in concurrent use).

BACKGROUND

Computer users are increasingly utilizing multiple display devices ("displays" or "screens") to concurrently work using multiple interfaces. For example, a multi-display arrangement allows a user to concurrently view separate spreadsheets, word processing documents, web browsers, etc., in partial or full screen modes. Currently, throughout the computer industry, a standard solution for pointer movement between multiple displays is based upon a calculation of a current screen's dimensional characteristics transposed over to another display device. In cases where the secondary display device is heterogeneous (e.g., a different size vertically and/or horizontally when compared to the first), existing approaches become a burden on the user's time (requiring more movement of the pointer controller (e.g. a hand-controlled mouse) on the part of the user to make up for its shortcomings).

SUMMARY

In general, embodiments of the present invention relate to an approach for providing automatically calculating and delivering proportional pointer locations during transition between multiple visual display devices (e.g., in regard to their characteristics, which may be heterogeneous, homogenous, or a mixture thereof). Specifically, the approaches described herein provide a solution for finding proportional locations of a pointer's on-screen graphic as the pointer is being transitioned/moved between multiple display devices (e.g., controlled by a single computer or controller).

A first aspect of the present invention provides a computer-implemented method for proportional transition between multiple display devices, comprising: determining an initial position of a pixel corresponding to a location of a pointer graphic on a first display device; calculating a corresponding position of the pixel on a second display device as the pointer graphic is moved from the first display device to the second display device, wherein the corresponding position is calculated based on a proportion of a set of dimensions of the first display device to a set of dimensions of the second display device; and placing the pointer graphic at the corresponding position when the pointer graphic has been moved to the second display device.

A second aspect of the present invention provides a system for proportional transition between multiple display devices, comprising: a bus; a processor coupled to the bus; and a memory medium coupled to or accessed from the bus, the memory medium comprising instructions to: determine an initial position of a pixel corresponding to a location of a pointer graphic on a first display device; calculate a corresponding position of the pixel on a second display device as the pointer graphic is moved from the first display device to the second display device, wherein the corresponding position is calculated based on a proportion of a set of dimensions of the first display device to a set of dimensions of the second display device; and place the pointer graphic at the corresponding position when the pointer graphic has been moved to the second display device.

A third aspect of the present invention provides a computer program product for proportional transition between multiple display devices, the computer program product comprising a computer readable storage media, and program instructions stored on the computer readable storage media, to: determine an initial position of a pixel corresponding to a location of a pointer graphic on a first display device; calculate a corresponding position of the pixel on a second display device as the pointer graphic is moved from the first display device to the second display device, wherein the corresponding position is calculated based on a proportion of a set of dimensions of the first display device to a set of dimensions of the second display device; and place the pointer graphic at the corresponding position when the pointer graphic has been moved to the second display device.

A fourth aspect of the present invention provides a method for deploying a system for proportional transition between multiple display devices, comprising: providing a computer infrastructure being operable to: determine an initial position of a pixel corresponding to a location of a pointer graphic on a first display device; calculate a corresponding position of the pixel on a second display device as the pointer graphic is moved from the first display device to the second display device, wherein the corresponding position is calculated based on a proportion of a set of dimensions of the first display device to a set of dimensions of the second display device; and place the pointer graphic at the corresponding position when the pointer graphic has been moved to the second display device.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention relate to an approach for providing automatically calculating and delivering proportional pointer locations during transition between multiple visual display devices (e.g., in regard to their characteristics, which may be heterogeneous, homogenous, or a mixture thereof). Specifically, the approaches described herein provide a solution for finding proportional locations of a pointer's on-screen graphic as the pointer is being transitioned/moved between multiple display devices (e.g., controlled by a single computer or controller).

Figure 1:
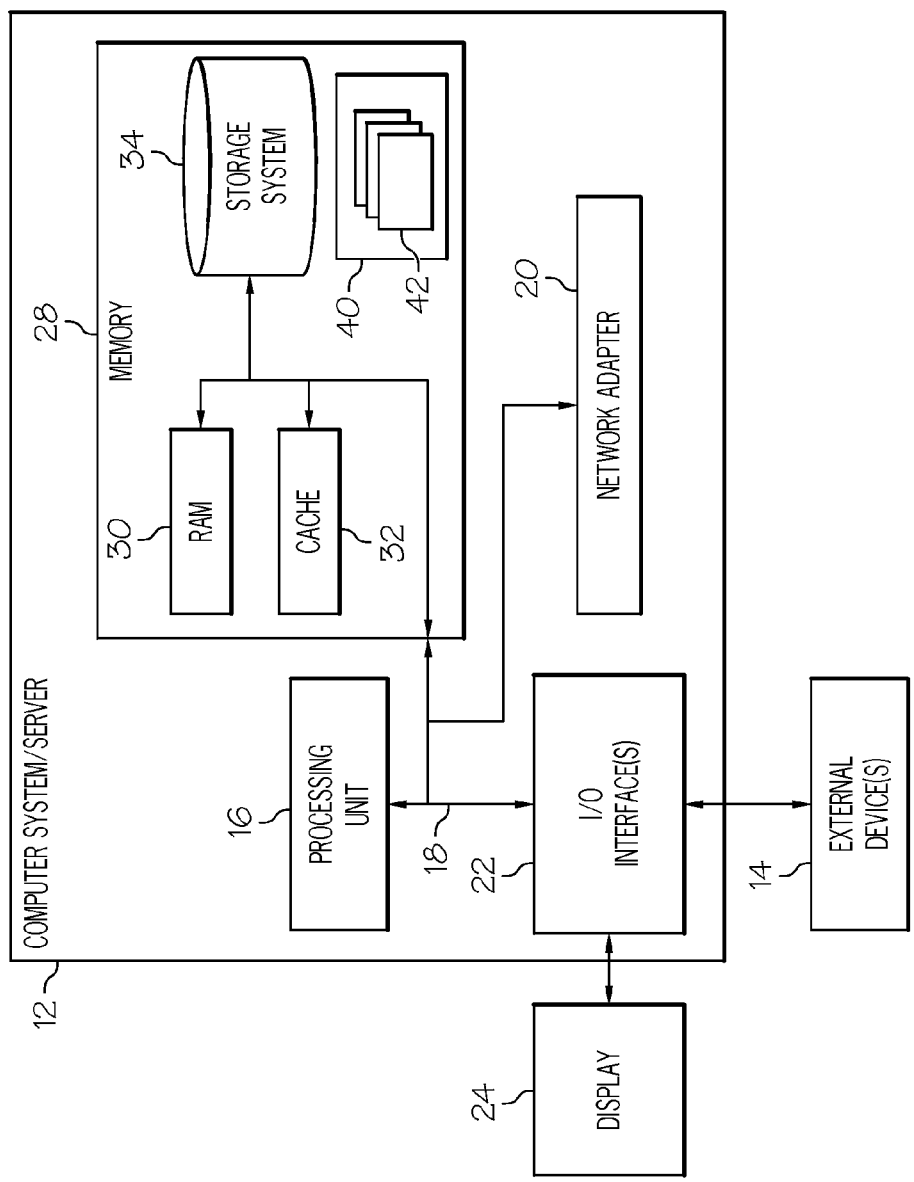
FIG. 1 depicts a computing node according to an embodiment of the present invention.

FIG. 1 depicts a computing node according to an embodiment of the present invention. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth herein.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin potential clients, thick potential clients, hand-held or laptop devices, mobile devices, global positioning systems (GPS), GPS-enabled devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media accessible by computer system/server 12, including both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each such media component can be connected to bus 18 by one or more data media interfaces. As will be further depicted and described below, memory 28 may include at least one program product having a set (e.g., at least one) of program modules that are configured with program instructions to carry out the functions of embodiments of the invention.

Program instructions embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42 with program instructions, may be stored in memory 28 by way of example, and not limitation. Memory 28 may also have an operating system, one or more application programs, other program modules, and program data. In general, program/utility 40 performs the function of the present invention as described herein. Each of the operating system, one or more application programs, other program modules, and program data or some combination thereof, may include an implementation of a networking environment. Program instructions of program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
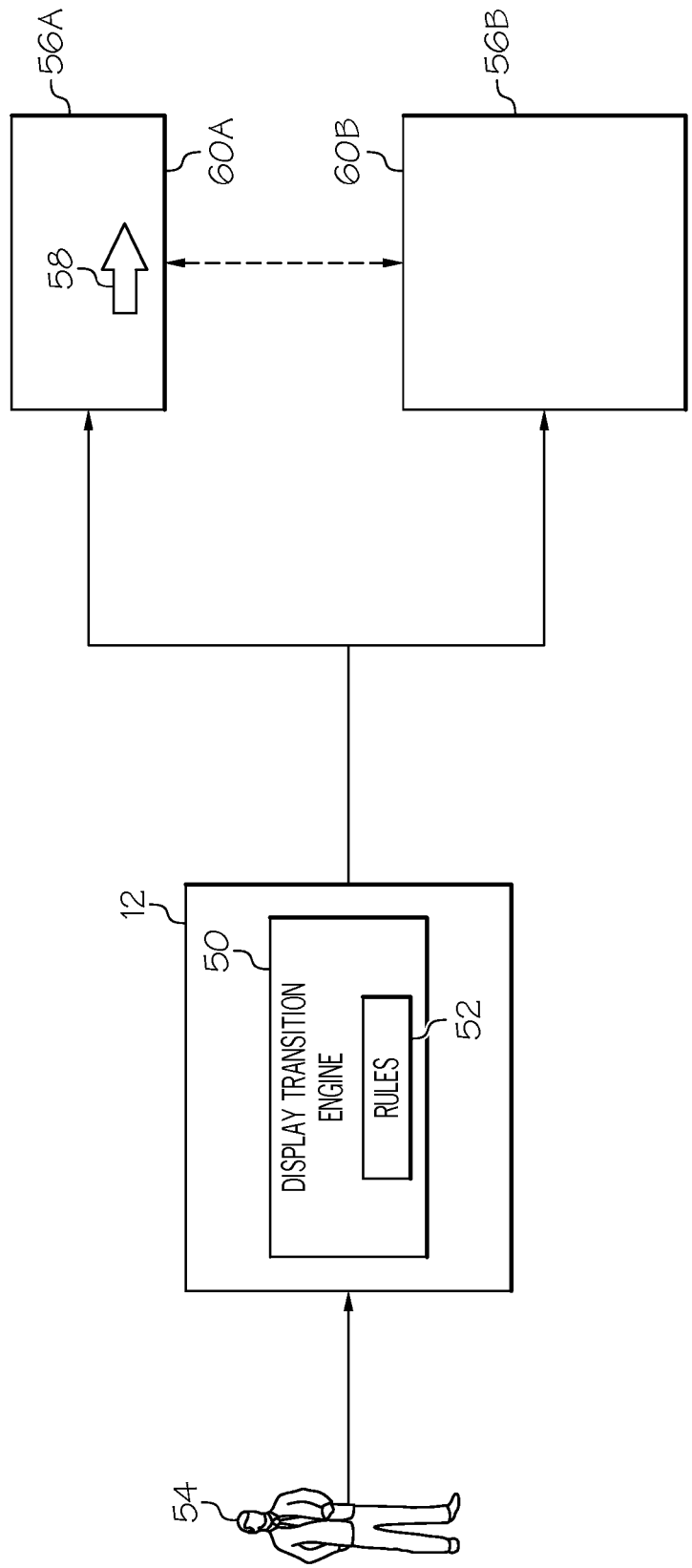
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment, each client need not have a display transition engine (engine 50). Rather, engine 50 could be loaded on a server (e.g., payment processing server) or server-capable device that communicates (e.g., wirelessly) with the clients to provide display transition functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides transition functionality hereunder.

As depicted, computer system 12 allows a user 54 to concurrently utilize multiple monitors/display devices 56A-B (e.g., having different sizes, orientations, aspect ratios, etc.). Along these lines, engine 50 may perform multiple functions similar to a general-purpose computer. Specifically, among other functions, engine 50 may (among other things): determine an initial position of a pixel corresponding to a location of a pointer graphic 58 on a first display device 56A; calculate a corresponding position of the pixel on a second display device 56B (e.g., having a different, size, orientation, aspect ratio, etc., of first display device 56A) as the pointer graphic 58 is moved from the first display device 56A to the second display device 56B, wherein the corresponding position is calculated based on a proportion of a set of dimensions of the first display device 56A to a set of dimensions of the second display device 56B (e.g., the initial position of the pixel being along a border 60A of the first display device 56A, and the corresponding position of the pixel being along a border 60B of the second display device 56B); determine a percentage along the border 60A of the first display device 56A from an endpoint of the border 60A of the first display device 56A; apply the percentage to the border 60B of the second display device 56B to calculate the corresponding position (e.g., the calculation comprising interpolation between the border 60A of the first display device 56A and the border 60B of the second display device 56B; place the pointer graphic 58 at the corresponding position when the pointer graphic 58 has been moved to the second display device 56B.

As described above, the approaches described herein provide for proportionally scaled operational navigation of a screen pointer (such as that typically controlled by mouse navigation) in using multiple display screens 56A-B, panels, or other devices. In accordance therewith, an intelligent algorithm is provided to automatically pre-calculate the pointer graphic 58 location, so that when the pointer is moved to a secondary display, the pointer graphic 58 is placed in a location that is proportional in correspondence to the length of the transitioning sides/borders 60A-B (the sides that are 'logically connected') of each display device 56A-B. This produces an effect that is intuitive with both mouse movement and the logically defined layout (comprised of position, size, orientation, etc.) of the multiple display devices 56A-B. These features are provided regardless of whether the display devices 56A-B are homogenous, heterogeneous, or a mixture thereof.

In a typical embodiment, system-automated software computation of the mouse pointer's location (at the borders of screens) is provided, so that a proportionately scaled transition effect of the screen pointer between any two display screens 56A-B utilized may be conducted in conjunction with movement of the pointer controller (e.g., a hand-controlled mouse). In general, such a computation will involve an interpolation or interleaving of the bordering dimensions of the two screens so that transition of a screen pointer from one display screen/device to another may be conducted in a manner that is scaled proportionately, so that possible barriers to the user in conducting this transition will be eliminated, and the user will be delivered a pointer location on screen border 60B on the destination display device 56B that is of the same scale proportionately relative to the position on the respective bordering screen border (e.g. relative to the position on screen border 60A on the originating display device 56A) when transition is made to the destination display device 56B. This inter-display transition will also be smooth operationally so that transition of the screen pointer from one display screen to another may also be done in direct conjunction with the movement of the pointer controller operated by the computer user (e.g., without any need for (a "jumping" or "warping") relocation of the mouse pointer on the destination display to a location beyond the destination location on the overall bordering screen border, and also without any need for user pre-programming of the screen pointer to use any specific predefined location per display device transitioned to).

It is understood that the aspects described herein can be implemented for any quantity of display devices operated from a common computer (e.g., computer system 12) and/or pointer controller. In the case of the latter, pointer controllers may actually be computers themselves. It is possible that a pointer controller can be made to perform the functions of the invention, while not fully fitting into the category of a "computer." Currently, small handheld controllers are a trend in the video game hardware industry and mobile communications electronics, and may be making their way into the realm of traditional computing. The embodiments described herein consider that these types of devices may be used to control the screen pointer of multiple displays. For example, a pointer controller may link (e.g., wirelessly) a handheld (or other) controller to a computer that is operating most of the functions of a display device. In addition, it is understood that the teachings recited herein may be utilized in an iterative fashion according to how the display devices are ordered and positioned logically (within logical definitions related to the order and position of specific display devices, which may be often changed or redefined).

Illustrative Embodiment

In order to better illustrate the teachings of the embodiments of the present invention, an illustrative comparison of a previous approach to the embodiments of the present invention will now be set forth.

Figure 3:
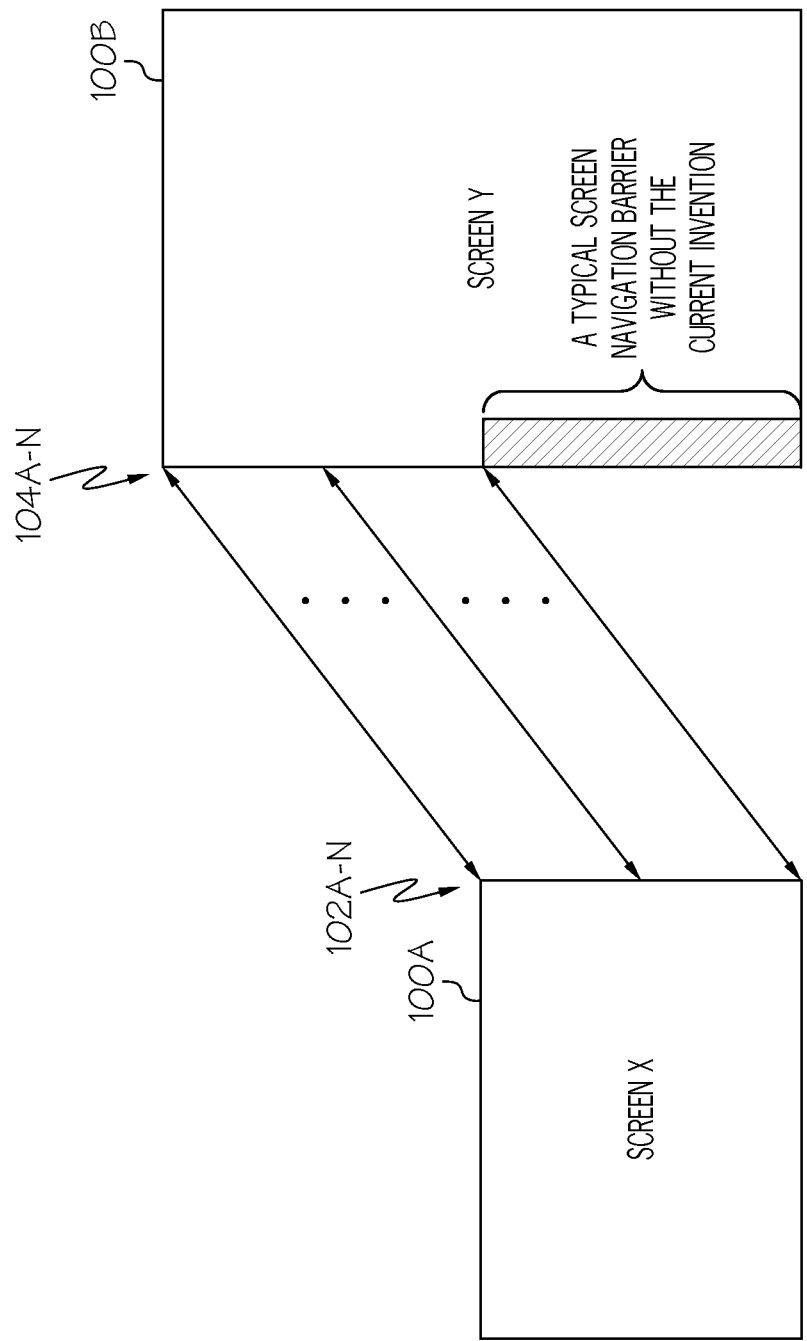
FIG. 3 depicts an example of pointer transition between display devices according to the prior art.
Figure 4:
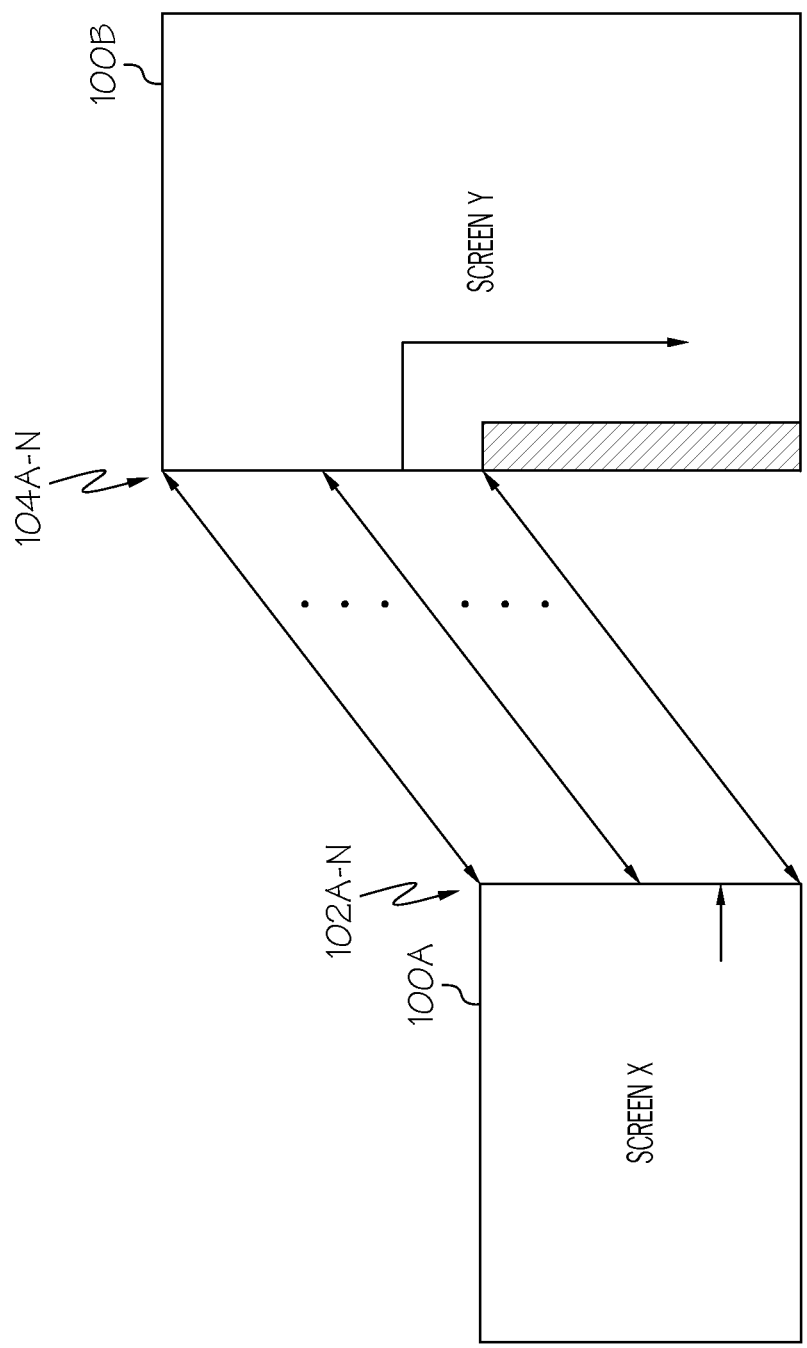
FIG. 4 depicts another example of pointer transition between display devices according to the prior art.
Figure 5:
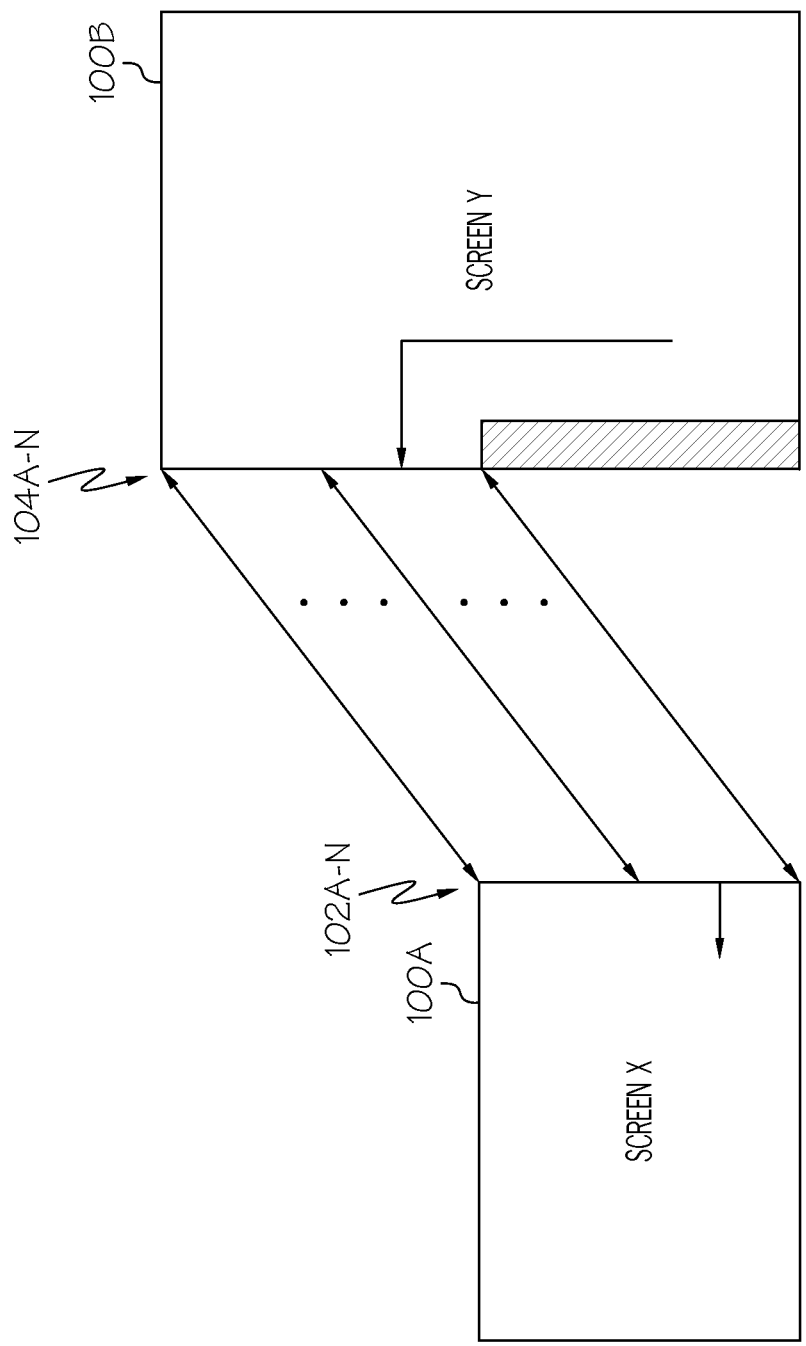
FIG. 5 depicts another example of pointer transition between display devices according to the prior art.

Referring to FIGS. 3-5, an example of inter-display/screen transition under a previous approach is shown. Referring first to FIG. 3, it can be seen that if screens 100A-B are aligned next to one another and one is "taller" than the other, a user operating the corresponding computer/controller may spend additional time manually finding a location on destination screen 100B that specifically corresponds to a proportionate counterpart location on originating screen 100A. Specifically, transitions between the two screens are such that pixel coordinates/locations 102A-N of screen 100A are corresponded to those exact pixel coordinates/locations 104A-N of screen 100B (e.g., pixel location 0,10 of screen 100A is associated with pixel location 0,10 of screen 100B regardless of the difference in size, orientation, etc. of screens 100A-B).

FIG. 4 shows an example of a transition from a smaller screen 100A to a larger, taller screen 100B. As depicted, once the transition is made from screen 100A to screen 100B, a user must then move the pointer vertically (or this could be conversely be horizontally, depending on the size, orientation, and aspect ratio of the displays where the pointer transition is taking place) to find the actual proportionate counterpart location on screen 100B. FIG. 5 shows an example of a transition from a larger screen 100B to a smaller screen 100A. As can be seen, a user must first navigate on screen 100B and then transition over to screen 100A to "land" on a counterpart location on screen 100A. As will be further described below, such manual efforts can waste time and money accordingly. Moreover, such manual efforts may also be less accurate.

Figure 6:
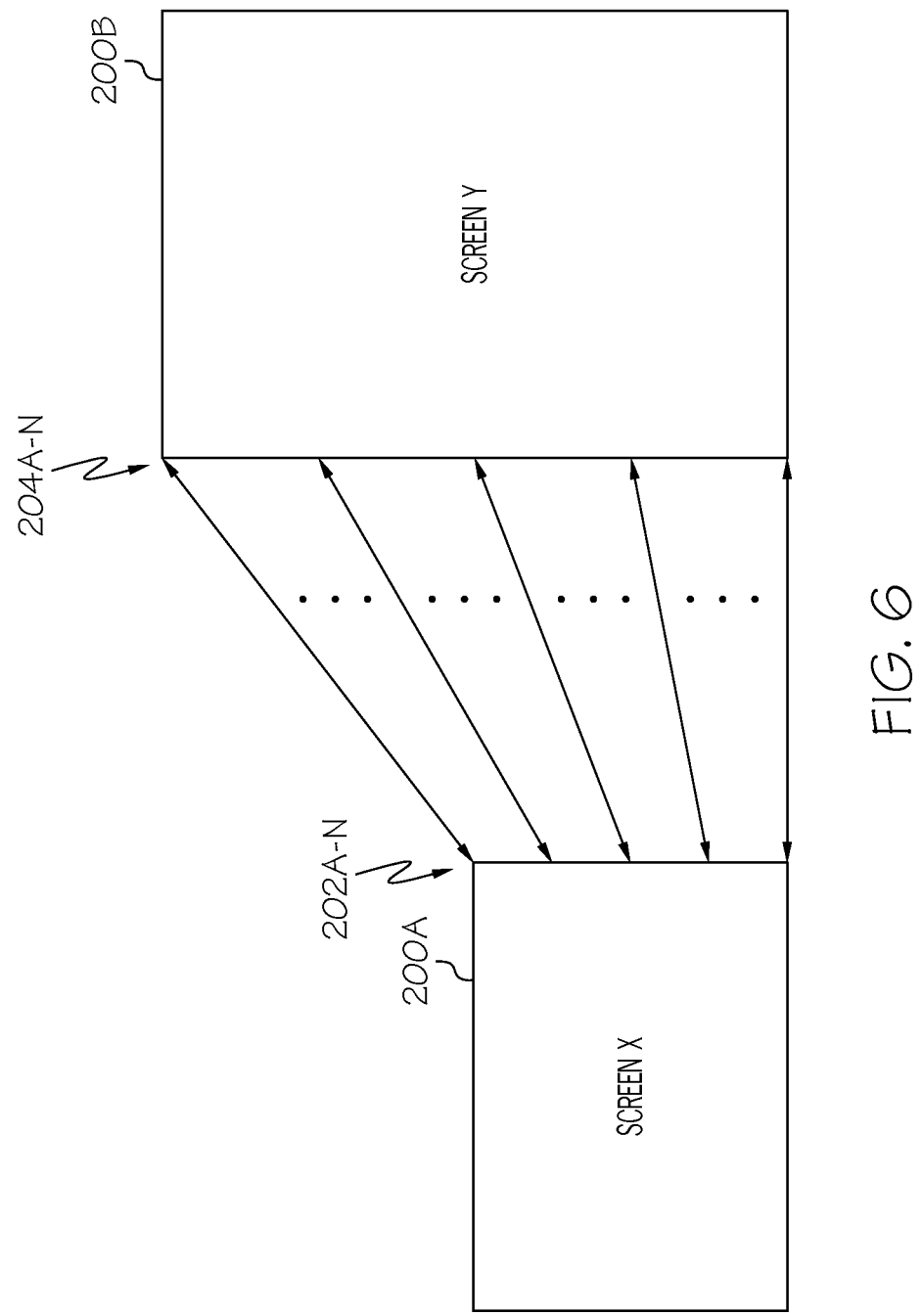
FIG. 6 depicts an example of pointer transition between display devices according to an embodiment of the present invention.
Figure 7:
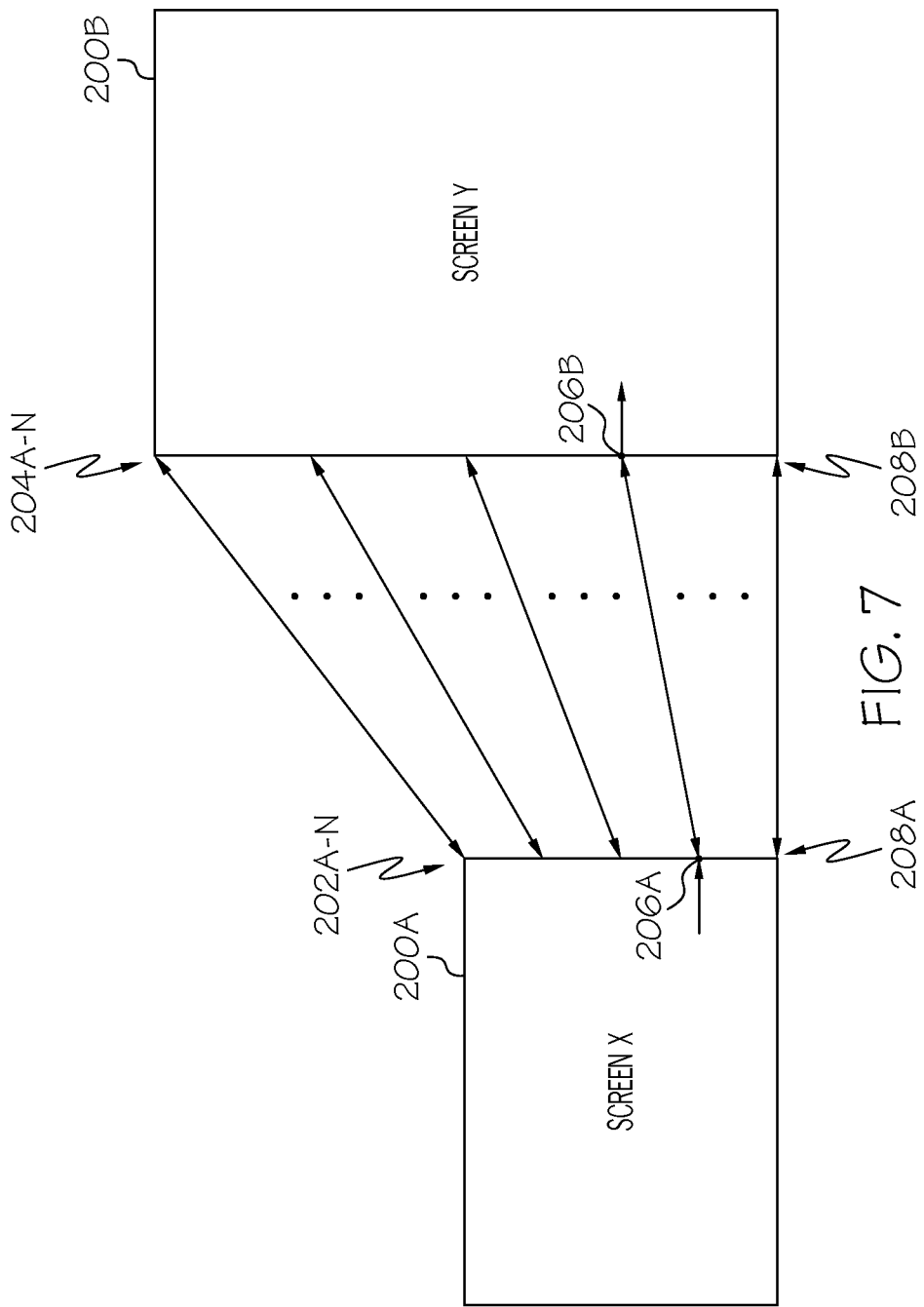
FIG. 7 depicts another example of pointer transition between display devices according to an embodiment of the present invention.
Figure 8:
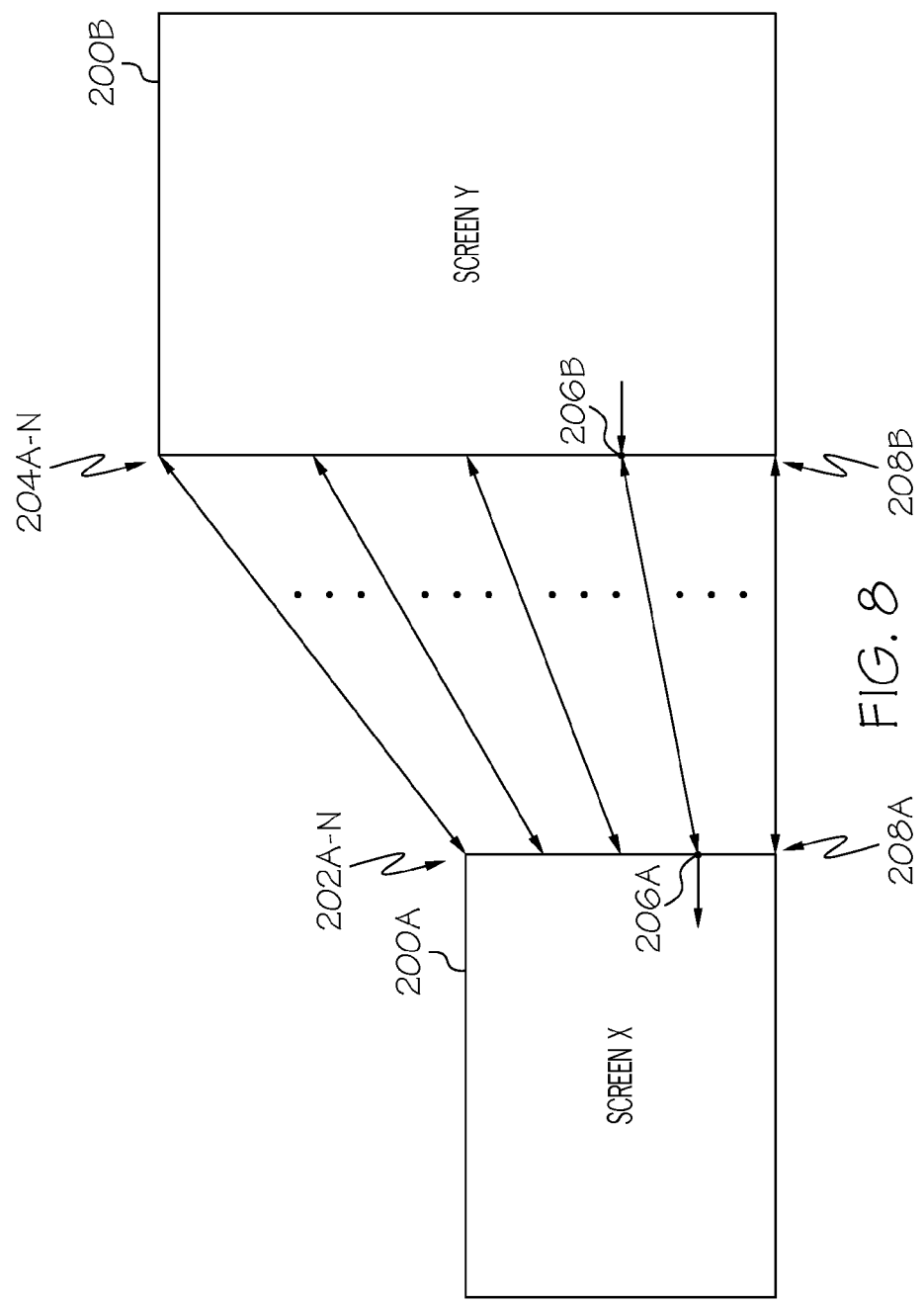
FIG. 8 depicts another example of pointer transition between display devices according to an embodiment of the present invention.

FIGS. 6-8 show how the automatic computation of proportionate counterpart locations between display devices/screens 200A-B will be performed in accordance with the embodiments of the present invention. As shown in FIG. 6, pixel coordinates/locations 202A-N of screen 200A will be mapped to locationally proportional pixel coordinates/locations 204A-N of screen 200B. As described above (and further described below), engine 50 (program 40) will perform a border interpolation between the screens 200A-B, so that a particular location on border 202A-N on screen 200A will have a size/orientation-adjusted, proportional counterpart location on border 204A-N on screen 200B, and vice-versa. This eliminates the need for much manual navigation (which is required with the previous approach) to "land" on the proportionate location on the destination screen (and this is true for transitions of the pointer between the two screens in either direction).

FIG. 7 shows an example of a transition from a smaller screen 200A to a larger screen 200B. As depicted, transition over location 206A of screen 200A toward screen 200B will have a counterpart location 206B on screen 200B that is determined based on screen 200A-B's bordering proportions relative to one another. This may be accomplished by determining a percentage along the border (e.g., from an endpoint such as the bottom corner of screen 200A, on border 202A-N, point 208A) on which location 206A is positioned and applying that percentage along border 204A-N of screen 200B (e.g., from a similar endpoint such as the bottom corner of screen 200B, on border 204A-N, point 208B). For example, if location 206A is 25% "up" from the bottom corner 208A of screen 200A, then location 206B will be 25% "up" from the mirror/counterpart bottom corner 208B of screen 200B. FIG. 8 shows an example of a transition from a larger screen 200B to a smaller screen 200A. As depicted, a similar concept may be applied to transition over location 206B to location 206A.

Thus, under the teachings recited herein, when a mouse pointer is moved from one display of any size, resolution, or orientation to another display of any size, resolution, or orientation (for example, a combination of large or small and vertical or horizontal), the effective placement of the screen pointer will be calculated in a manner that is effectively the same as an interpolation or interleaving of the two adjacent borders of the bordering screens in order to provide a transition of the displayed screen pointer that is proportionate to the relative locations on the borders of the two different screens. Along these lines, in working with each display screen, the overall screen coordinates are considered by defining the four corners using pixel coordinates. Typically 0,0 is defined as being the top left of the screen, although 0,0 could also be any other place.

An illustrative Scenario: A definition of the overall screen dimensions of 2 typical display screens may be as follows (where pixel coordinate 0,0 is defined as being the top left of the screen, although 0,0 could also be any other place): For a screen that is 1440×900 (the format used here is representative of the information as it may be stored in computer readable storage media):

| Screen Name | X1 | Y1 | X2 | Y2 |
| --- | --- | --- | --- | --- |
| Screen 1 | 0 | 0 | 1439 | 899 |

For a screen that is 1050×1680:

| Screen Name | X1 | Y1 | X2 | Y2 |
| --- | --- | --- | --- | --- |
| Screen 2 | 0 | 0 | 1049 | 1679 |

Example of calculation of locations of screen borders that border other screens: In the instance of a screen1 which is configured with resolution 1440×900 to have an adjacent display screen on its right side, the representative pixel values for the screen border that borders other display screens may be (in the form used above):

| Screen Name | X1 | Y1 | X2 | Y2 |
| --- | --- | --- | --- | --- |
| Screen 1 | 1439 | 0 | 1439 | 899 |

For the example adjacent display screen that is configured to be on the right side of screen1, in the instance of it having resolution 1050×1680 (which happens to be a vertical orientation), the representative pixel values for the screen border that borders other display screens may be (in the form used above):

| Screen Name | X1 | Y1 | X2 | Y2 |
| --- | --- | --- | --- | --- |
| Screen 2 | 0 | 0 | 0 | 1679 |

Shown below are illustrative processing and algorithm pseudo code segments:

```
Processing [pseudo code]:
display_screen_pointer_location( );
{
if multiscreen = "yes"
{
while { system in mode where screen pointer is visible }
{
//** { read screen input pointer device };
//** { compare value representing current pointer location with values
stored as those of bordering screen borders };
if { pointer on bordering screen border }
{
    //** the below for loop will populate all of the following data
structures with correct values:
    //** next_up: disp, x, y
    //** next_down: disp, x, y
    //** next_left: disp, x, y
    //** next_right: disp, x, y
    { for each of the 4 directions: }
        if { direction is on an adjacent screen: }
        { determine corresponding "proportionate" pointer transition
        location on adjacent screen, e.g., "disp2, x, y" for that
        direction - via branch to algorithm below}
        else { direction is not on an adjacent screen: }
        //** compute adjacent location in the usual manner {movement
        within current display}
        } end if;
    } end for;
}
else { pointer is not on bordering screen location }
{
    //** the below for loop will populate all of the following data
structures with correct values:
    //** next_up: disp, x, y
    //** next_down: disp, x, y
    //** next_left: disp, x, y
    //** next_right: disp, x, y
    { for each of the 4 directions: }
    {
        //** compute adjacent location in the usual manner
    } end for;
} end else;
} end if;
} end while;
} end if;
} end function;
Algorithm [pseudo code]:
compute_to_adjacent_screen( );
{
//* { determine current pointer position as a percentage of the distance
from an endpoint (such as location 0) on the current screen border
//** {subsequently apply this percentage to the overall proportion of the
bordering screen border on the adjacent screen, as follows:
if { bordering screen is toward the top (y=0 in our screen1 scenario) }
{
{compute proportionate screen pointer location on bottom border of
adjacent screen (y=1679 in our screen2 scenario),
    using x1 and x2 values, and store the value in next_up }
}
else if { bordering screen is toward the bottom (y=899 in our screen1
scenario) }
{
{ compute proportionate screen pointer location on top border of
adjacent screen (y=0 in our screen2 scenario),
    using x1 and x2 values, and store the value in next_down }
}
else if { bordering screen is toward the left (x=0 in our screen1 scenario) }
{
{ compute proportionate screen pointer location on right border of
adjacent screen (x=1049 in our screen2 scenario),
    using y1 and y2 values, and store the value in next_left }
}
else { bordering screen is toward the right (x=1439 in our screen1
scenario) }
{
{ compute proportionate screen pointer location on left border of
adjacent screen (x=0 in our screen2 scenario),
    using y1 and y2 values, and store the value in next_right }
}
} end function;
```

Cost Savings Example: Among other things, the teachings recited herein can result in a computable cost savings to a user and/or organization. In one example, this may compute to a total savings (in the area of worker productivity) of 4.5 out of 5 seconds conducting each round-trip, screen-to-screen, screen pointer navigation operation. At an average of 5 such transitions per employee per hour, this computes to a savings of 22.5 seconds out of 25 seconds spent on this activity per hour per employee. The business organization will save $0.3125 approximately per hour for each employee performing this work activity. With 800 employees, this computes to savings by the business organization of $250 per hour with the invention (or the equivalent of $2000 per 8-hour work day, $10,000 per 5-day workweek, or for 52 weeks per year: $520,000 per year), versus performing the same work activity without the teachings recited herein.

Figure 9:
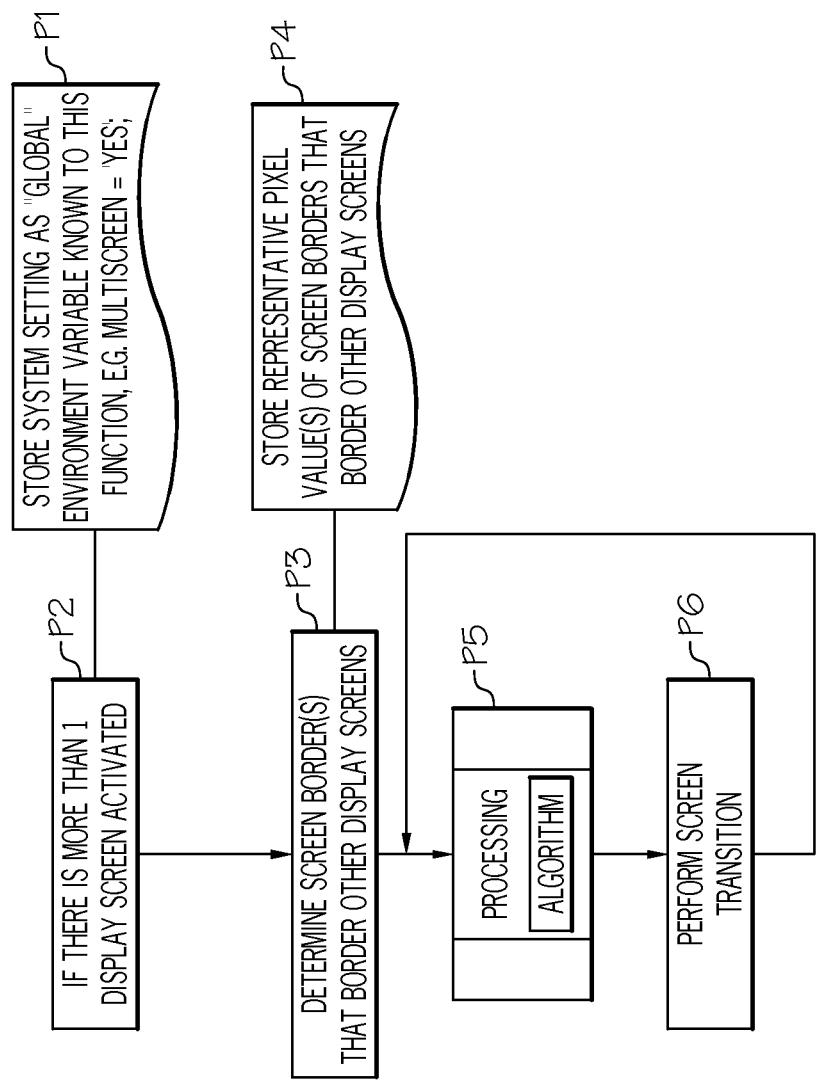
FIG. 9 depicts a method flow diagram according to an embodiment of the present invention.

Referring now to FIG. 9, a process flow diagram according to an embodiment of the present invention is shown. In general, it is understood that this method is typically performed and/or enabled by program 40 and/or engine 50. In step P1, a multi-screen setting is set to "yes" if more than one display screen is activated in step P2. In step P3, screen borders that border other display screens are determined, and representative pixel values of those screen borders are stored in step P4. In step P5, processing will occur using the algorithm set forth above. That is, counterpart screen locations between multiple display screens will be computed, and in step P6, a screen transition from one display screen to another display screen will occur using the computation in step P5 after which the process may loop back as shown.

While shown and described herein as a proportional display transition solution, it is understood that the invention further provides various alternative embodiments. For example, in one embodiment, the invention provides a computer-readable/useable medium that includes computer program code to enable a computer infrastructure to provide proportional display transition as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide proportional display transition functionality. In this case, the service provider can create, maintain, support, etc., a computer infrastructure, such as computer system/server 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for proportional display transition. In this case, a computer infrastructure, such as computer system 12/server (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, externally connected storage systems, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for proportional transition between multiple display devices, comprising:
    determining an initial position of a pixel corresponding to a location of a pointer graphic on a first display device;
    calculating a corresponding position of the pixel on a second display device as the pointer graphic is moved from the first display device to the second display device, wherein the corresponding position is calculated based on a proportion of a set of dimensions of the first display device to a set of dimensions of the second display device; and
    placing the pointer graphic at the corresponding position when the pointer graphic has been moved to the second display device,
    wherein a particular movement of a pointer controller causes the pointer graphic to travel a first distance when the pointer graphic is on the first display device and to travel a second distance calculated based on the first distance and the proportion when the pointer graphic is on the second display device.

2. The computer-implemented method of claim 1, the initial position of the pixel being along a border of the first display device, and the corresponding position of the pixel being along a border of the second display device.

3. The computer-implemented method of claim 2, further comprising determining a percentage along the border of the first display from an endpoint of the border of the first display, the calculating comprising applying the percentage to the border of the second display device to calculate the corresponding position.

4. The computer-implemented method of claim 3, the calculating comprising an interpolation between the border of the first display device and the border of the second display device.

5. The computer-implemented method of claim 1, the first display device and the second display device being operated from a common computer or a common controller.

6. The computer-implemented method of claim 1, the first display device and the second display device having different sizes, orientations, or aspect ratios.

7. A system for proportional transition between multiple display devices, comprising:
    a bus;
    a processor coupled to the bus; and
    a memory medium coupled to or accessed via the bus, the memory medium comprising instructions to:
    determine an initial position of a pixel corresponding to a location of a pointer graphic on a first display device;
    calculate a corresponding position of the pixel on a second display device as the pointer graphic is moved from the first display device to the second display device, wherein the corresponding position is calculated based on a proportion of a set of dimensions of the first display device to a set of dimensions of the second display device; and
    place the pointer graphic at the corresponding position when the pointer graphic has been moved to the second display device,
    wherein a particular movement of a pointer controller causes the pointer graphic to travel a first distance when the pointer graphic is on the first display device and to travel a second distance calculated based on the first distance and the proportion when the pointer graphic is on the second display device.

8. The system of claim 7, the initial position of the pixel being along a border of the first display device, and the corresponding position of the pixel being along a border of the second display device.

9. The system of claim 8, the memory medium further comprising instructions to determine a percentage along the border of the first display from an endpoint of the border of the first display, the calculation comprising applying the percentage to the border of the second display device to calculate the corresponding position.

10. The system of claim 9, the calculation comprising an interpolation between the border of the first display device and the border of the second display device.

11. The system of claim 7, the first display device and the second display device being operated from a common computer or a common controller.

12. The system of claim 7, the first display device and the second display device having at least one of the following: different sizes, orientations, or aspect ratios.

13. A computer program product for proportional transition between multiple display devices, the computer program product comprising a computer readable storage media, and program instructions stored on the computer readable storage media, to:
   determine an initial position of a pixel corresponding to a location of a pointer graphic on a first display device;
   calculate a corresponding position of the pixel on a second display device as the pointer graphic is moved from the first display device to the second display device, wherein the corresponding position is calculated based on a proportion of a set of dimensions of the first display device to a set of dimensions of the second display device; and
   place the pointer graphic at the corresponding position when the pointer graphic has been moved to the second display device,
   wherein a particular movement of a pointer controller causes the pointer graphic to travel a first distance when the pointer graphic is on the first display device and to travel a second distance calculated based on the first distance and the proportion when the pointer graphic is on the second display device.

14. The computer program product of claim 13, the initial position of the pixel being along a border of the first display device, and the corresponding position of the pixel being along a border of the second display device.

15. The computer program product of claim 14, further comprising program instructions stored on the computer readable storage media to determine a percentage along the border of the first display from an endpoint of the border of the first display, the calculation comprising applying the percentage to the border of the second display device to calculate the corresponding position.

16. The computer program product of claim 15, the calculation comprising an interpolation between the border of the first display device and the border of the second display device.

17. The computer program product of claim 13, the first display device and the second display device being operated from a common computer or a common controller.

18. The system of claim 13, the first display device and the second display device having at least one of the following: different sizes, orientations, or aspect ratios.

19. A method for deploying a system for proportional transition between multiple display devices, comprising:
   providing a computer infrastructure being operable to:
      determine an initial position of a pixel corresponding to a location of a pointer graphic on a first display device;
      calculate a corresponding position of the pixel on a second display device as the pointer graphic is moved from the first display device to the second display device, wherein the corresponding position is calculated based on a proportion of a set of dimensions of the first display device to a set of dimensions of the second display device; and
      place the pointer graphic at the corresponding position when the pointer graphic has been moved to the second display device,
      wherein a particular movement of a pointer controller causes the pointer graphic to travel a first distance when the pointer graphic is on the first display device and to travel a second distance calculated based on the first distance and the proportion when the pointer graphic is on the second display device.

20. The method of claim 19, the initial position of the pixel being along a border of the first display device, and the corresponding position of the pixel being along a border of the second display device.

\* \* \* \* \*